United States Patent
Arici et al.

(10) Patent No.: US 8,131,104 B2
(45) Date of Patent: Mar. 6, 2012

(54) METHOD AND APPARATUS FOR ADJUSTING THE CONTRAST OF AN INPUT IMAGE

(75) Inventors: Tarik Arici, Atlanta, GA (US); Yucel Altunbasak, Alpharetta, GA (US)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 1159 days.

(21) Appl. No.: 11/866,246

(22) Filed: Oct. 2, 2007

(65) Prior Publication Data

US 2008/0085061 A1 Apr. 10, 2008

Related U.S. Application Data

(60) Provisional application No. 60/827,915, filed on Oct. 3, 2006.

(51) Int. Cl.
  *G06K 9/40* (2006.01)
(52) U.S. Cl. ........ 382/268; 382/260; 382/264; 382/265; 382/266; 382/274
(58) Field of Classification Search .......... 382/264–269, 382/260, 274
  See application file for complete search history.

(56) References Cited

U.S. PATENT DOCUMENTS

| | | | | | |
|---|---|---|---|---|---|
| 4,912,557 | A | * | 3/1990 | Faroudja | 348/614 |
| 5,119,195 | A | * | 6/1992 | Christopher | 348/623 |
| 5,526,446 | A | * | 6/1996 | Adelson et al. | 382/275 |
| 5,532,951 | A | * | 7/1996 | Ohlsson et al. | 708/320 |
| 5,715,335 | A | * | 2/1998 | De Haan et al. | 382/265 |
| 5,745,542 | A | * | 4/1998 | Gordon et al. | 378/4 |
| 5,790,692 | A | * | 8/1998 | Price et al. | 382/133 |
| 5,799,111 | A | * | 8/1998 | Guissin | 382/254 |
| 5,819,035 | A | * | 10/1998 | Devaney et al. | 709/202 |
| 5,852,475 | A | * | 12/1998 | Gupta et al. | 348/606 |
| 5,875,003 | A | * | 2/1999 | Kato et al. | 348/699 |
| 5,940,536 | A | * | 8/1999 | Wake et al. | 382/205 |
| 6,041,145 | A | * | 3/2000 | Hayashi et al. | 382/268 |
| 6,330,371 | B1 | * | 12/2001 | Chen et al. | 382/260 |
| 6,362,579 | B1 | * | 3/2002 | Heizmann et al. | 315/370 |
| 6,707,952 | B1 | * | 3/2004 | Tan et al. | 382/268 |
| 6,728,416 | B1 | * | 4/2004 | Gallagher | 382/265 |

(Continued)

FOREIGN PATENT DOCUMENTS

EP 1 553 778 A1 7/2005

(Continued)

OTHER PUBLICATIONS

Nonlinear recursive—image processing, Tsai et al., CH2561-9, 1988, IEEE, pp. 828-831.*

(Continued)

*Primary Examiner* — Jayesh A Patel
(74) *Attorney, Agent, or Firm* — Conley Rose, P.C.

(57) ABSTRACT

A method and apparatus is provided for adjusting the contrast of an input image. A blurred image corresponding to the input image is obtained, the brightness level of at least some of the pixels in the input image being varied to provide the blurred image. A ring likelihood for pixels in the input image is obtained, the ring likelihood providing a measure of the likelihood that said pixels are non-edge pixels in the neighborhood of an edge pixel. The output image is produced as a sum of the brightness levels in the input image and the blurred image in dependence on the ring likelihoods.

10 Claims, 3 Drawing Sheets

U.S. PATENT DOCUMENTS

| | | | |
|---|---|---|---|
| 6,774,943 B1 * | 8/2004 | Kao et al. | 348/252 |
| 7,339,601 B2 * | 3/2008 | Kim | 345/690 |
| 7,526,142 B2 * | 4/2009 | Sheraizin et al. | 382/275 |
| 7,576,894 B2 * | 8/2009 | Huang | 358/3.27 |
| 7,593,588 B2 * | 9/2009 | Sugeno et al. | 382/266 |
| 7,602,447 B2 * | 10/2009 | Arici et al. | 348/687 |
| 7,860,167 B2 * | 12/2010 | Le Dinh et al. | 375/240.2 |
| 2003/0128888 A1 * | 7/2003 | Li | 382/260 |
| 2004/0156559 A1 * | 8/2004 | Cheng et al. | 382/286 |
| 2004/0190789 A1 * | 9/2004 | Liu et al. | 382/274 |
| 2005/0100241 A1 * | 5/2005 | Kong et al. | 382/268 |
| 2006/0093233 A1 * | 5/2006 | Kano et al. | 382/254 |
| 2007/0076972 A1 * | 4/2007 | Chiu | 382/261 |
| 2007/0183684 A1 * | 8/2007 | Bhattacharjya | 382/274 |

FOREIGN PATENT DOCUMENTS

| | | | |
|---|---|---|---|
| EP | 1553778 A1 * | 7/2005 | |
| EP | 1 659 799 A1 | 5/2006 | |
| EP | 1659799 A1 * | 5/2006 | |

OTHER PUBLICATIONS

Content adaptaive image de-blocking, Zhao et al., 078038527, 2004, IEEE, pp. 299-304.*

Edge-preserving smoothing—filters, Colin et al. 0/7803-1377-1, 1993 IEEE, pp. 9-11.*

European Search Report for Application EP 06 25 5795 and Annex thereto, dated May 15, 2007, 4 pages.

Zhao, M., et al., Content Adaptive Image De-blocking; IEEE, 2004, pp. 299-304.

Kong, Hao-Song, et al., Coding Artifact Reduction Using Edge Map Guided Adaptive and Fuzzy Filter, Merl—A Mitsubishi Elecktric Research Laboratory, Jun. 2004, 6 pages.

Tsai, Tu-Chih, et al., Nonlinear Recursive Filters and Applications to Image Processing, New York, Apr. 11-14, 1988, International Conference on Acoustics, Speech and Signal Processing. ICASSP, New York, IEEE, US, vol. 2 Conf. 13.

* cited by examiner

METHOD AND APPARATUS FOR ADJUSTING THE CONTRAST OF AN INPUT IMAGE

CROSS-REFERENCE TO RELATED APPLICATIONS

This application claims the benefit of priority to U.S. application Ser. No. 60/827,915 filed Oct. 3, 2006, the content of which is hereby incorporated by reference in its entirety for all purposes.

FIELD OF INVENTION

The present invention relates to a method of and apparatus for adjusting the contrast of an input image.

BACKGROUND

The present invention has particular application in minimising so-called "ringing" artifacts that can arise in digital images when displayed.

Most image/video coding standards that are used for compressing digital images, such as JPEG and MPEG-1/2/4, use block-based processing for the compression. Visual artifacts, such as blocking noise and ringing noise, occur in decompressed images due to the block-based coding, coarse quantization and coefficient truncation that are used. Ringing noise manifests itself as halos or rings around edges in the displayed image. Contrast adjustment or enhancement of images, particularly digital images, is used in many fields, including enhancing the contrast of a digital image for display by a television receiver or other display device, for printing by a printer, in digital cameras, etc., etc. Contrast enhancement is used to improve the contrast in medical and other images. A number of techniques are known for attempting to remove or minimise the ringing noise in particular.

For example, in the paper "Coding Artifact Reduction Using Edge Map Guided Adaptive and Fuzzy Filter" by Hao Song Kong et al of the Mitsubishi Electric Research Laboratory (Cambridge, Mass., USA) published in 2004, and the corresponding US patent application US-A-2005/0100241, there is disclosed a method for reducing ringing artifacts in images. This is shown schematically in FIG. 1. In the pixel-classification block, a pixel is classified as a smooth pixel, a texture pixel or an edge pixel using thresholds on the local variance. The local variance is measured using blocks of 3×3 neighbouring pixels. If the pixel is classified as an edge pixel, its neighboring pixels are filtered using a fuzzy identity filter.

A disadvantage of this prior art is the use of thresholds on the local variance. The local variance and, therefore, thresholds depend on the contrast level, which includes the lightning conditions of the source environment when the image is taken. This results in misclassification as it is not possible to adjust the thresholds optimally. Another disadvantage of this prior art is that the fuzzy identity filter uses order-statistical information, which is a complex operation and is therefore expensive to implement and in any event may create artifacts such as local flickering since order-statistical information is not linear and may exhibit jumps.

Another method is disclosed in "Content Adaptive Image De-blocking" by Meng Zhao et. al., published in 2004 by IEEE, which is shown schematically in FIG. 2. This method art also uses a classification-based approach. Each (current) pixel is classified in a pixel classification block using adaptive dynamic range coding (ADRC). A pixel in the neighbourhood of the current pixel is transformed into "1" if its value is greater than the neighbourhood mean, and transformed into "0" if is value is less than the neighbourhood mean. After this operation, the transformed 1s and 0s in a pixel's neighbourhood are appended to obtain a binary number, which is used as an index to a filter look-up table. The filter retrieved from the look-up table is used to filter the pixels in that neighbourhood and obtain the new output pixel corresponding to the current pixel. The filter for each class is computed using a training procedure. Original, artifact-free images are compressed using a block-based compression algorithm, such as JPEG 2000. Then the compressed image is decoded to obtain the degraded image in which artifacts have been introduced. Each pixel in the decoded image is classified using ADRC and the filter coefficients are computed using a linear least squares estimation technique.

One disadvantage of this prior art is again related to the classification block. Misclassifications lead to blurring of artifact-free pixels, which is undesirable. To reduce the misclassification rate, training over a large database of images can be done, but this will decrease the quality of the obtained filters. Also, for good performance, the number of classes must be large, which introduces computational complexity and requires more memory resources.

According to a first aspect of the present invention, there is provided a method of adjusting the contrast of an input image formed of pixels in which each pixel has an input brightness level to produce an output image in which at least some of the pixels have an output brightness level that is different from their input brightness level, the method comprising:

obtaining a blurred image corresponding to the input image, the brightness level of at least some of the pixels in the input image being varied to provide the blurred image;

obtaining a ring likelihood for pixels in the input image, the ring likelihood providing a measure of the likelihood that said pixels are non-edge pixels in the neighbourhood of an edge pixel;

producing the output image as a sum of the brightness levels in the input image and the blurred image in dependence on the ring likelihoods.

Thus, a blurred image is obtained which is then added to the input image in manner that depends on the ring likelihoods at each or at least some of the pixels in the input image, thereby reducing the ringing artifacts around edges whilst preserving edges and without affecting other parts of the image (such as smooth regions and texture regions).

The blurred image may be obtained by filtering the brightness levels of the input image with at least one recursive spatially-adaptive edge-preserving filter. In a preferred embodiment, the filter preserves the edges and blurs both sides of the edges by not mixing pixels on one side of the edge with pixels on the other side of the edge.

The filter preferably has recursion coefficients that are adaptive to edge information in the input image. In a preferred embodiment, where there is an edge, the corresponding recursion coefficient is reduced accordingly depending on the relative strength of the edge. As an alternative to using recursion coefficients, another function can be used that decreases with decreasing edge strength, such as an exponential function.

In a preferred embodiment, the ring likelihood for a pixel is the product of (i) the likelihood that said pixel is a non-edge pixel and (ii) the likelihood of the strongest edge in the neighbourhood of said pixel, wherein said edge likelihoods are obtained from said recursion coefficients. Whilst other functions for obtaining the edge likelihoods may be used, such as the output of a Laplacian filter, the recursion coefficients already contain edge information and have already been calculated in this preferred embodiment, and thus this provides an accurate and yet computationally efficient way of obtaining the ring likelihoods.

In a most preferred embodiment, the blurred image is obtained by filtering the brightness levels of the input image with a first recursive spatially-adaptive edge-preserving filter that operates in a first direction across the pixels of the input image, filtering the brightness levels of the input image with a second recursive spatially-adaptive edge-preserving filter that operates in a second direction across the pixels of the input image that is opposite the first direction, and obtaining the brightness levels of the blurred image by taking an average of the output of the first and second recursive spatially-adaptive edge-preserving filters. As above, in a preferred embodiment, the filters, which may be "forward" and "backward" filters that operate respectively in a forward and a backward direction across the image, preserve the edges and blur both sides of the edges by not mixing pixels on one side of the edge with pixels on the other side of the edge. As is known per se, a filter of this type can give rise to an unwanted phase delay. By using two filters which are run in opposite directions across the pixels, and by averaging the outputs of the two filters, the phase delays of the two filters can effectively be made to cancel each other out.

At least one of the filters preferably has recursion coefficients that are adaptive to edge information in the input image. More preferably, both of the filters have recursion coefficients that are adaptive to edge information in the input image. Again, in a preferred embodiment, where there is an edge, the corresponding recursion coefficient is reduced accordingly depending on the relative strength of the edge.

In a preferred embodiment, the ring likelihood for a pixel is the product of (i) the likelihood that said pixel is a non-edge pixel and (ii) the likelihood of the strongest edge in the neighbourhood of said pixel, wherein said edge likelihoods are obtained from said recursion coefficients. Again, the recursion coefficients already contain edge information and have already been calculated in this preferred embodiment, and thus this provides an accurate and yet efficient way of obtaining the ring likelihoods.

In general, it is preferred that said recursion coefficients decrease with decreasing edge strength.

In embodiments, the ring likelihood for a pixel is the product of (i) the likelihood that said pixel is a non-edge pixel and (ii) the likelihood of the strongest edge in the neighbourhood of said pixel.

Said neighbourhood may be a block of j×k pixels centred on the respective pixel, where j and k are positive integers. In one particular example, the neighbourhood is a block of 8×8 pixels, which corresponds to the blocks of 8×8 pixels used in many block-based compression techniques. Neighborhoods of pixels of other sizes may of course be used, particularly if the original compression that produced the input image used blocks of a different size.

In a preferred embodiment, the sum of the brightness levels in the input image and the blurred image is a weighted sum, the weight of the brightness levels of the blurred image that are summed with the brightness levels of the input image at any particular pixel depending on the ring likelihood for that pixel. In the preferred embodiment, if a pixel is less likely to be a ringing artifact pixel, then less weight is given to the blurred image such that the input image pixels are substantially preserved for artifact-free pixels. On the other hand, if a pixel is more likely to be a ringing artifact pixel, then more weight is given to the blurred image such that the ringing artifact is reduced in this region of the output image.

According to a second aspect of the present invention, there is provided apparatus for adjusting the contrast of an input image formed of pixels in which each pixel has an input brightness level to produce an output image in which at least some of the pixels have an output brightness level that is different from their input brightness level, the apparatus comprising:

an image blurrer for obtaining a blurred image corresponding to the input image, the image blurrer being operable such that the brightness level of at least some of the pixels in the input image are varied to provide the blurred image;

a ring likelihood calculator for obtaining a ring likelihood for pixels in the input image, the ring likelihood providing a measure of the likelihood that said pixels are non-edge pixels in the neighbourhood of an edge pixel; and, a summer for obtaining a sum of the brightness levels in the input image and the blurred image to produce the output image in dependence on the ring likelihoods.

The preferred apparatus and/or method may be incorporated into any apparatus and/or method that is used to enhance the resolution of a digital image, including for example an image processor used in a television set or the like, printers, digital cameras, television broadcast capture cards, digital image processing software which may be used in many applications, etc., etc. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the present invention will now be described by way of example with reference to the accompanying drawings, in which.

BRIEF DESCRIPTION OF PREFERRED EMBODIMENTS

Figure 1:
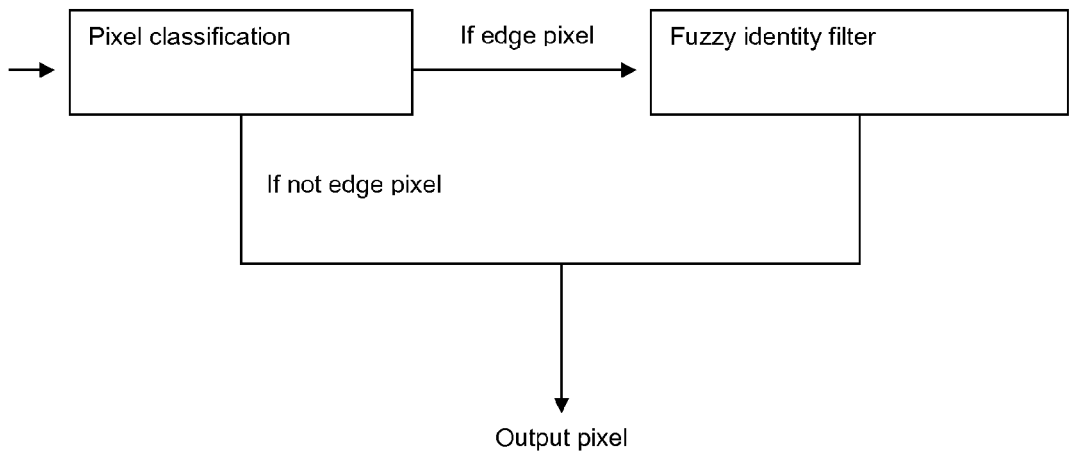
FIG. 1 and FIG. 2 are schematic block diagrams showing two prior art techniques.
Figure 2:
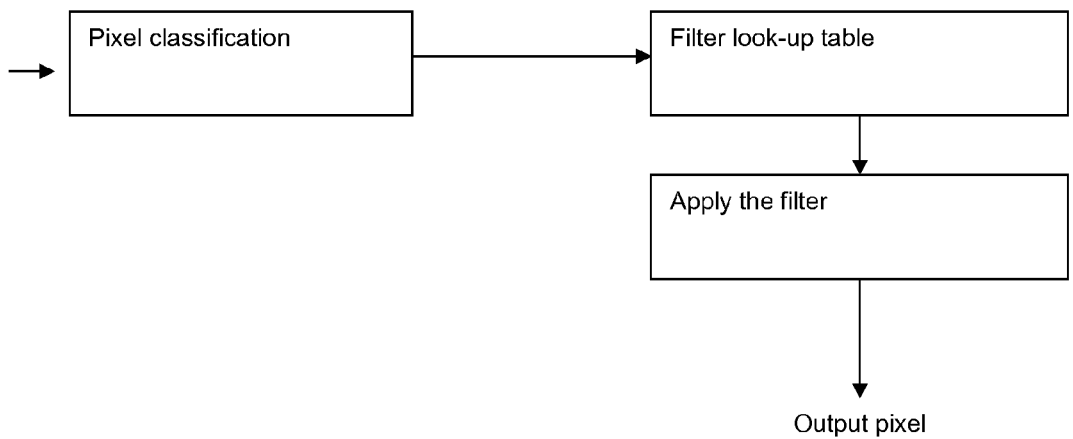
Figure 3:
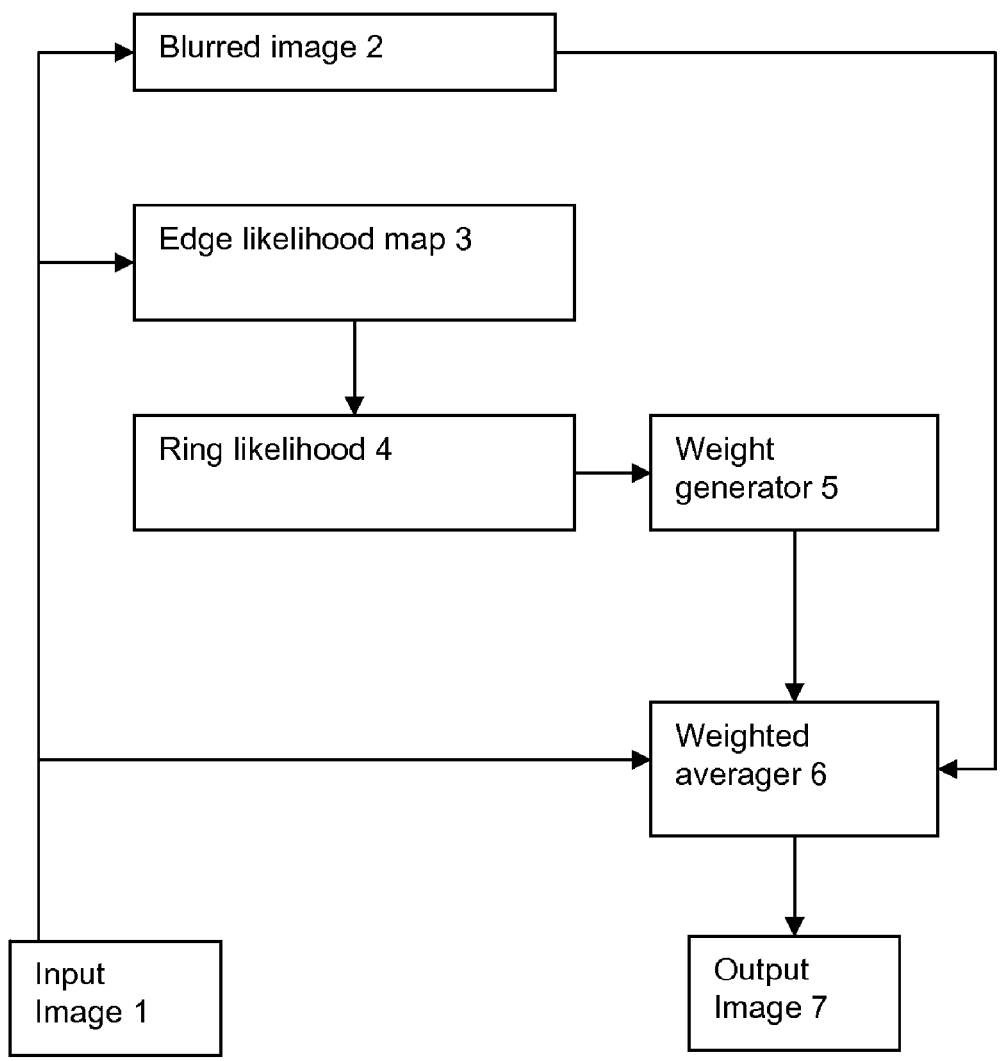
FIG. 3 is a schematic block diagram showing an overview of an example of an embodiment of the present invention.

Referring first to FIG. 3, in overview an example of an embodiment of the present invention operates as follows. An input image 1 is blurred to obtain a blurred image 2. In addition, an edge likelihood map 3 of the input image 1 is obtained to provide, for each pixel in the input image 1, the likelihood that that particular pixel is an edge pixel in the input image 1. From these edge likelihoods, the ring likelihood 4 for each pixel is then obtained. In the preferred embodiment, the ring likelihood for a particular pixel provides a measure of how likely it is that the current pixel is a non-edge pixel in the neighbourhood of a strong edge pixel.

Then, the ring likelihoods 4 are used to generate weights 5 which are provided to a summer 6. In the summer 6, the input image 1 is added to a weighted version of the blurred image 2 to provide the output image 7. In other words, brightness levels for pixels in the input image 1 are added to weighted versions of brightness levels of the pixels in the blurred image 2, the weights used in the addition depending on the ring likelihoods for the pixels concerned, in order to provide the brightness levels for the pixels in the output image 7.

Figure 4:
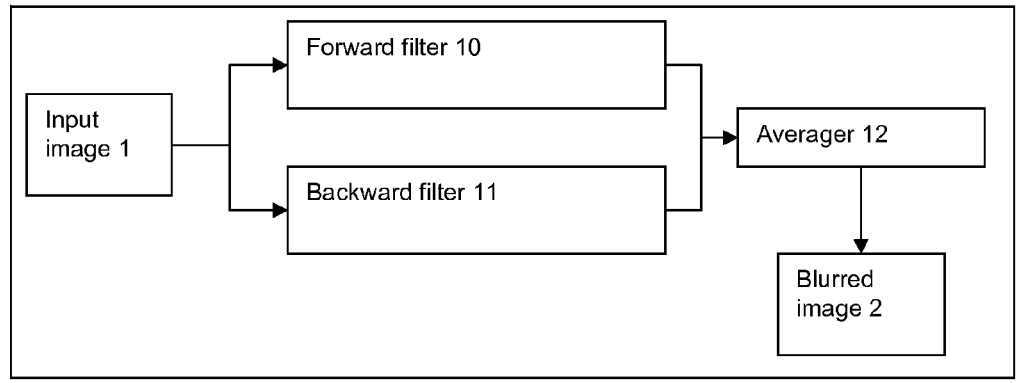
FIG. 4 is a schematic block diagram showing an example of an image blurrer of the embodiment of FIG. 3.

FIG. 4 shows schematically the obtaining of the blurred image 2 of the preferred embodiment. The input image 1 is blurred using a recursive spatially adaptive edge-preserving filter. A "recursive" filter is one that uses recursion, i.e. the present value of the output signal is dependent on at least one previously calculated value of the output signal. The preferred recursive filter preserves the edges and blurs both sides of the edges by not mixing the pixels on one side of an edge with the pixels on the other side of the edge. The blurring of the image around the edges inevitably removes ringing artifacts around the edges.

The use of such a filter can introduce a phase shift in the filtered output. Accordingly, it is more preferred to use two filters, namely a forward filter 10 and a backward filter 11, each of which is an edge-preserving spatially adaptive recursive filter. The forward filter 10 progresses in the direction of the forward raster-scan direction, namely starting from the top left corner of the image and ending with the bottom right corner, and carries out recursion on previous filtered outputs.

The recursion equation for one preferred embodiment of the forward filter 10 is:

$$F[m,n] = c1[m,n]*F[m,n-1] + c2[m,n]*F[m-1,n] + c3[m,n]*F[m-1,n-1] + c4[m,n]*F[m-1,n+1] + (1-c1[m,n]-c2[m,n]-c3[m,n]-c4[m,n])*I[m,n],$$

where m, n are the row and columns numbers of the pixels, I[m,n] are the brightness levels of the input image pixels, F[m,n] is the output of the forward filter 10, and c1, c2, c3, c4 are recursion coefficients, which are spatially adapted. (It will be understood that when attempting to filter the first pixel, no filtered values for a previous pixel are available during the recursion. This can be handled in a number of ways. In one example, the values for the relevant pixel from the original image are used as an approximation.)

For achieving bounded-input/bounded-output stability, it is preferred that all of the recursion coefficients are non-negative and that their sum is less than or equal to 1 (i.e. (c1+c2+c3+c4)≦1).

The recursion coefficients are adapted with edge information so that edges are not blurred when producing the blurred image 2. In one embodiment, this is achieved by computing the recursion coefficients as below, which also satisfies the above stability conditions:

$$c1[m,n]=1-|(F[m,n-1]-I[m,n])/255|a/4$$

$$c2[m,n]=1-|(F[m-1,n]-I[m,n])/255|a/4$$

$$c3[m,n]=1-|(F[m-1,n-1]-I[m,n])/255|a/4$$

$$c4[m,n]=1-|(F[m-1,n+1]-I[m,n])/255|a/4,$$

where a is any real number, typically between 1 and 8.

In the above equations, each previous recursion output is used to determine the edge strength between the current input pixel and the input pixel which is co-located with that previous recursion output. If there is an edge, then the recursion coefficient is decreased and the corresponding previous recursion output contributes less to the current recursion output.

The backward filter 11 is similar to the forward filter 10 but it progresses in the backward raster-scan style starting from the bottom-right corner of the image and ending with the top-left corner. The recursion equation for one preferred embodiment of the backward filter 11 is:

$$B[m,n]=c5*B[m,n+1]+c6*B[m+1,n]+c7*B[m+1,n-1]+c8*B[m+1,n+1]+(1-c5-c6-c7-c8)*I[m,n],$$

where m, n are the row and columns numbers, I[m,n] is the brightness level of the input image pixel, B[m,n] is the output of the backward filter 11, and c5, c6, c7, c8 are recursion coefficients. These recursion coefficients are spatially adapted similarly as for the forward filter 10 and may be as follows:

$$c5[m,n]=1-|(B[m,n+1]-I[m,n])/255|a/4$$

$$c6[m,n]=1-|(B[m+1,n]-I[m,n])/255|a/4$$

$$c7[m,n]=1-|(B[m+1,n-1]-I[m,n])/255|a/4$$

$$c8[m,n]=1-|(B[m+1,n+1]-I[m,n])/255|a/4,$$

(Again, it will be understood that when attempting to filter the first pixel, no filtered values for a previous pixel are available during the recursion. This can be handled in a number of ways. In one example, the values for the relevant pixel from the original image are used as an approximation.)

For one or both of the forward and backward filters 10,11, the computational complexity can be reduced by setting some recursion coefficients to zero such that the recursion progresses on less number of previous outputs. As another alternative, the recursion coefficients can be found using another function that decreases with edge strength, such as an exponential.

The averager 12 averages the two outputs of the forward and backward filters 10,11 to produce the brightness levels (M[m,n]) of the pixels of the blurred image 2:

$$M[m,n]=(F[m,n]+B[m,n])/2$$

Figure 5:
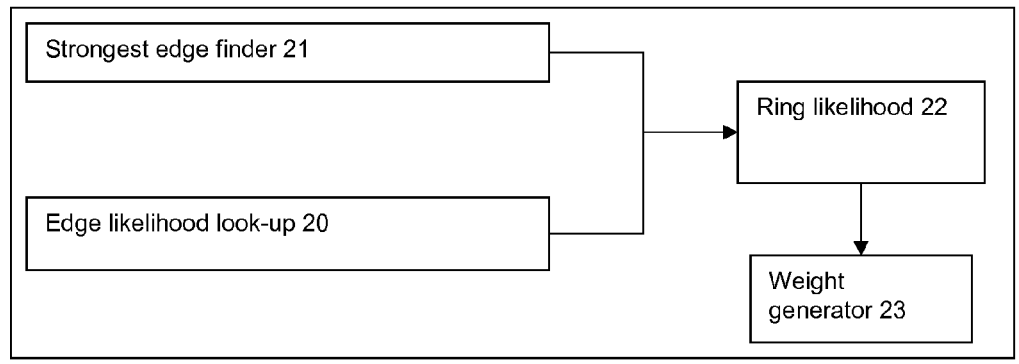
FIG. 5 is a schematic block diagram showing an example of a ring likelihood calculator of the embodiment of FIG. 3; and, FIG. 6 is a schematic block diagram showing an example of a summer of the embodiment of FIG. 3.
Figure 6:
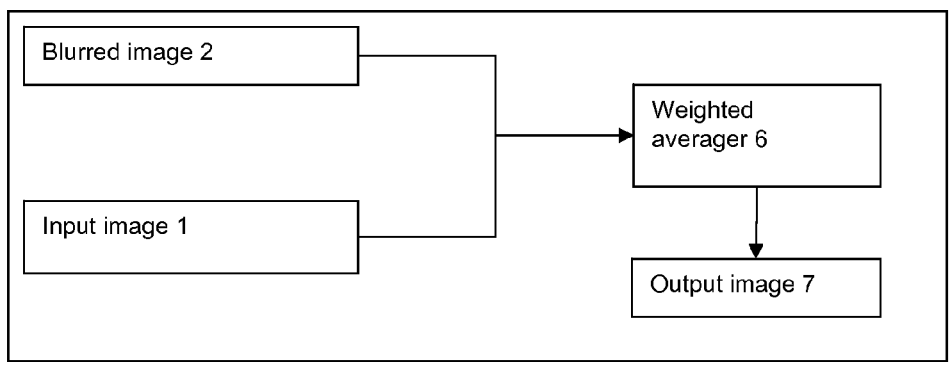

Referring now to FIGS. 3 and 5, the ring likelihood is then calculated for each pixel in the input image 1. The ring likelihood provides a measure of how likely it is that the current pixel is a non-edge pixel in the neighbourhood of a strong edge pixel. In one embodiment, the "neighbourhood" of the pixel is a defined block of pixels around the current pixel. An 8×8 block for the neighbourhood is preferred because it is the typical block size used in common compression algorithms. Typically, the 8×8 neighbourhood for each pixel is defined as the block with the top-left pixel coordinate: [m',n']=[floor(m/8)*floor(n/8)*8]. In compression standards, the 8×8 blocks are non-overlapping so in this respect, the "current pixel" can be any pixel of the 8×8 block to which it belongs.

In one embodiment, the ring likelihood is obtained by multiplying the likelihood that the current pixel is a non-edge with the strongest likelihood of an edge in the 8×8 neighbourhood (i.e. the edge likelihood for the pixel in the block that is most likely to be an edge).

An edge likelihood map 3 is obtained in the preferred embodiment by finding the edge likelihood for each pixel by subtracting the sum of its forward and backward recursion coefficients from two:

$$E[m,n]=2-c1[m,n]-c2[m,n]-c3[m,n]-c4[m,n]-c5[m,n]-c6[m,n]-c7[m,n]-c8[m,n]$$

Instead of utilizing the recursion coefficients, other edge methods of obtaining the edge likelihoods 20 may be used, such as using the output of a Laplacian filter. However, edge information from the recursion coefficients is used in the preferred embodiment since it has already been obtained in the recursive filter computation process.

To find the strongest edge SE, a search 21 is made for the maximum edge strength within the current pixel's 8×8 neighbourhood as follows:

$$mBase = \text{floor}(m/8)*8$$

$$nBase = \text{floor}(n/8)*8$$

$$SE[m,n] = \max\{E[x,y] \text{ such that } mBase \leq x < (mBase+8), \text{ and } nBase \leq y < (nBase+8)\}$$

This shows the likelihood SE of a strong edge in the same compression block as the current pixel.

The ring likelihood (RL) 22 is the probability of a strong edge in the block when the current pixel is not an edge, which may be obtained as follows:

$$RL = SE[m,n]*(1-E[m,n])$$

The ring likelihoods 22 are then used to generate weights 23 which are used to determine the degree of mixing of the input image 1 with the blurred image 2 at each pixel. In particular, if a pixel's ring likelihood is high, then more weight is given to the brightness levels of the pixels of the blurred image 2 in order to remove or at least reduce the ringing artifact. Correspondingly, if a pixel's ring likelihood is low, then less weight is given to the brightness levels of the pixels of the blurred image 2 in order to preserve detail that is present in the input image 1, particularly in the smooth pixel areas and the texture pixel areas. In a preferred embodiment, the ring likelihood at each pixel is used as the weight in the weighted averager 6. However, other methods or functions for obtaining the weights may be used, provided they meet the requirement that the weight is higher when the pixel's ring likelihood is higher and vice versa.

Thus, in the preferred weighted averager, at each pixel the brightness level in the input image 1 is added with a weighted version of the brightness level at the same pixel in the blurred image 2 to provide the output image 6:

$$O[m,n] = RL*M[m,n] + (1-RL)*I[m,n]$$

where O[m,n] are the brightness levels of the output image pixels and, again, M[m,n] are the brightness levels of the pixels of the blurred image 2, I[m,n] are the brightness levels of the input image pixels, and RL is the ring likelihoods of the respective pixels.

It should be noted that other functions for the ring likelihoods may be used, such as non-linearly transformed ring likelihoods, provided that they always map ring likelihoods in the range [0-1] to the range [0-1].

The preferred embodiment provides for reduction of the ringing artifact in digital images. The preferred embodiment avoids the classification-based approach of the prior art mentioned above and preserves edges without affecting other parts of the image (such as smooth regions and texture regions). The preferred embodiment is not computationally intensive and can be operated cost-effectively even in domestic equipment, such as a television set.

Embodiments of the present invention have been described with particular reference to the examples illustrated. However, it will be appreciated that variations and modifications may be made to the examples described within the scope of the present invention.

The invention claimed is:

1. A method of adjusting the contrast of an input image formed of pixels in which each pixel has an input brightness level to produce an output image in which at least some of the pixels have an output brightness level that is different from their input brightness level, the method comprising:

obtaining a blurred image corresponding to the input image, the brightness level of at least some of the pixels in the input image being varied to provide the blurred image;

obtaining a ring likelihood for pixels in the input image, the ring likelihood providing a measure of the likelihood that said pixels are non-edge pixels in the neighbourhood of an edge pixel;

producing the output image as a sum of the brightness levels in the input image and the blurred image in dependence on the ring likelihood, wherein the blurred image is obtained by filtering the brightness levels of the input image with at least one recursive spatially-adaptive edge-preserving filter, wherein the filter has recursion coefficients that are adaptive to edge information in the input image, wherein the ring likelihood for a pixel is a product of (i) a likelihood that said pixel is a non-edge pixel and (ii) a likelihood of a strongest edge in the neighbourhood of said pixel, wherein said likelihoods are obtained from said recursion coefficients.

2. A method in a television of adjusting the contrast of an input image formed of pixels in which each pixel has an input brightness level to produce an output image in which at least some of the pixels have an output brightness level that is different from their input brightness level, the method comprising:

obtaining a blurred image corresponding to the input image, the brightness level of at least some of the pixels in the input image being varied to provide the blurred image;

obtaining a ring likelihood for pixels in the input image, the ring likelihood providing a measure of the likelihood that said pixels are non-edge pixels in the neighbourhood of an edge pixel;

producing the output image as a sum of the brightness levels in the input image and the blurred image in dependence on the ring likelihood, wherein the blurred image is obtained by filtering the brightness levels of the input image with a first recursive spatially-adaptive edge-preserving filter that operates in a first direction across the pixels of the input image, filtering the brightness levels of the input image with a second recursive spatially-adaptive edge-preserving filter that operates in a second direction across the pixels of the input image that is opposite the first direction, and obtaining the brightness levels of the blurred image by taking an average of the output of the first and second recursive spatially-adaptive edge-preserving filters, wherein at least one of the filters has recursion coefficients that are adaptive to edge information in the input image, and wherein the ring likelihood for a pixel is a product of (i) a likelihood that said pixel is a non-edge pixel and (ii) a likelihood of a strongest edge in the neighbourhood of said pixel, wherein said likelihoods are obtained from said recursion coefficients.

3. The method according to claim 1, wherein said recursion coefficients decrease with decreasing edge strength.

4. The method according to claim 1, wherein said neighbourhood is a block of j×k pixels centred on the respective pixel, where j and k are positive integers.

5. The method according to claim 1, wherein the sum of the brightness levels in the input image and the blurred image is a weighted sum, the weight of the brightness levels of the blurred image that are summed with the brightness levels of the input image at any particular pixel depending on the ring likelihood for that pixel.

6. An apparatus for adjusting the contrast of an input image formed of pixels in which each pixel has an input brightness level to produce an output image in which at least some of the pixels have an output brightness level that is different from their input brightness level, the apparatus comprising:

an image blurrer, implemented by dedicated hardware or a processor programmed with software, for obtaining a blurred image corresponding to the input image, the image blurrer being configured such that the brightness level of at least some of the pixels in the input image are varied to provide the blurred image;

a ring likelihood calculator, implemented by dedicated hardware or a processor programmed with software, for obtaining a ring likelihood for pixels in the input image, the ring likelihood providing a measure of the likelihood that said pixels are non-edge pixels in the neighbourhood of an edge pixel; and, a summer, implemented by dedicated hardware or a processor programmed with software, for obtaining a sum of the brightness levels in the input image and the blurred image to produce the output image in dependence on the ring likelihood, wherein the image blurrer includes at least one recursive spatially-adaptive edge-preserving filter for obtaining the blurred image by filtering the brightness levels of the input image, wherein the filter has recursion coefficients that are adaptive to edge information in the input image, wherein the ring likelihood calculator is configured to calculate the ring likelihood for a pixel as a product of (i) a likelihood that said pixel is a non-edge pixel and (ii) a likelihood of a strongest edge in the neighbourhood of said pixel, wherein said likelihoods are obtained from said recursion coefficients.

7. An apparatus in a television for adjusting the contrast of an input image formed of pixels in which each pixel has an input brightness level to produce an output image in which at least some of the pixels have an output brightness level that is different from their input brightness level, the apparatus comprising:

an image blurrer, implemented by dedicated hardware or a processor programmed with software, for obtaining a blurred image corresponding to the input image, the image blurrer being configured such that the brightness level of at least some of the pixels in the input image are varied to provide the blurred image;

a ring likelihood calculator, implemented by dedicated hardware or a processor programmed with software, for obtaining a ring likelihood for pixels in the input image, the ring likelihood providing a measure of the likelihood that said pixels are non-edge pixels in the neighbourhood of an edge pixel; and, a summer, implemented by dedicated hardware or a processor programmed with software, for obtaining a sum of the brightness levels in the input image and the blurred image to produce the output image in dependence on the ring likelihood, wherein the image blurrer includes a first recursive spatially-adaptive edge-preserving filter that operates in a first direction across the pixels of the input image and a second recursive spatially-adaptive edge-preserving filter that operates in a second direction across the pixels of the input image that is opposite the first direction, the image blurrer being configured to obtain the brightness levels of the blurred image by taking an average of the output of the first and second recursive spatially-adaptive edge-preserving filters, wherein at least one of the filters has recursion coefficients that are adaptive to edge information in the input image, wherein the ring likelihood calculator is configured to calculate the ring likelihood for a pixel as a product of (i) a likelihood that said pixel is a non-edge pixel and (ii) a likelihood of the strongest edge in the neighbourhood of said pixel, wherein said likelihoods are obtained from said recursion coefficients.

8. The apparatus according to claim 6, wherein said recursion coefficients decrease with decreasing edge strength.

9. The apparatus according to claim 6, wherein said neighbourhood is a block of j×k pixels centred on the respective pixel, where j and k are positive integers.

10. The apparatus according to claim 6, wherein the summer is configured such that the sum of the brightness levels in the input image and the blurred image is a weighted sum, the weight of the brightness levels of the blurred image that are summed with the brightness levels of the input image at any particular pixel depending on the ring likelihood for that pixel.

* * * * *